(12) United States Patent
Western (10) Patent No.: US 6,542,952 B1
(45) Date of Patent: Apr. 1, 2003

(54) PCI COMPUTER SYSTEM HAVING A TRANSITION MODULE AND METHOD OF OPERATION

(75) Inventor: Gary E. Western, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/499,814

(22) Filed: Feb. 8, 2000

(51) Int. Cl.[7] ............................. G06F 13/00; H05K 7/02
(52) U.S. Cl. ....................... 710/305; 710/300; 710/316; 361/805
(58) Field of Search ........................ 710/100, 300–304, 710/8–19, 305, 316, 317; 361/748, 784, 785, 788, 805

(56) References Cited

U.S. PATENT DOCUMENTS

| | | | | |
|---|---|---|---|---|
| 5,426,738 A | * | 6/1995 | Hsieh et al. ................... 326/38 |
| 5,621,650 A | * | 4/1997 | Agrawal et al. ............... 326/41 |
| 5,625,780 A | * | 4/1997 | Hsieh et al. ................. 370/388 |
| 5,887,158 A | * | 3/1999 | Sample et al. ................. 716/15 |
| 6,425,027 B1 | * | 7/2002 | Mills et al. .................. 710/300 |
| 2002/0052994 A1 | * | 5/2002 | Khan et al. ................. 710/300 |

* cited by examiner

*Primary Examiner*—Sumati Lefkowitz
(74) *Attorney, Agent, or Firm*—S. Kevin Pickens; Kevin D. Wills (57) ABSTRACT

A PCI computer system includes component boards (130) adjacent to and coupled to a PCI bus (120), a controller board (310) coupled to the PCI bus, a transition module (140) coupled to the PCI bus, a switching matrix (150, 151) coupled to the transition module, and an I/O module (160, 161) coupled to the component boards and the controller board via the switching matrix, the transition module, and the PCI bus. A method of operating the PCI computer system includes transmitting a first signal from one of the component boards, transmitting a second signal from the I/O module, transmitting a third signal from the controller board in response to the first and second signals to configure the switching matrix to make the pin-out configuration of the one of the component boards compatible with the I/O module, and transmitting a first set of data between the component board and the I/O module.

33 Claims, 5 Drawing Sheets

PCI COMPUTER SYSTEM HAVING A TRANSITION MODULE AND METHOD OF OPERATION

FIELD OF THE INVENTION

This invention relates, in general, to computer systems, and more particularly, to peripheral component interface (PCI) computer systems and methods of operation.

BACKGROUND OF THE INVENTION

Each component board in a peripheral component interface (PCI) computer system requires a transition module that is custom designed for the component board to route signals to other parts of the computer system. However, the PCI bus standard does not include a standard for input and output pins of the PCI bus. Accordingly, the custom designed transition modules are expensive.

Furthermore, the transition module typically interconnects a component board with a different system component where the component board and the system component are made by competing manufacturers. Under these circumstances, both manufacturers must cooperate to custom design the transition module. However, this cooperation by competing manufacturers is difficult to achieve. Additionally, if the transition module is not designed properly, the associated component board and/or system component can be damaged.

Moreover, if a new component board is used to replace an old non-functional component board and if the new and old component boards have different pin configurations, then the old transition module must also be replaced with a new transition module. This replacement of a functional transition module further increases the costs associated with the PCI computer system.

To circumvent the problems associated with the expensive, custom designed transition modules, individual component boards can be hard-wired directly to the PCI backplane. However, many errors often occur during the manual hard-wiring process. Moreover, this manual process is time consuming and, therefore, often requires extensive computer system downtime.

Accordingly, a need exists for a PCI computer system that is capable of easily and economically connecting a plurality of different component boards made by different manufacturers to other system components.

BRIEF DESCRIPTION OF THE DRAWINGS

The invention will be better understood from a reading of the following detailed description, taken in conjunction with the accompanying drawing figures in which.

For simplicity and clarity of illustration, the drawing figures illustrate the general manner of construction, and elements in the drawing figures are not necessarily drawn to scale. Additionally, the same reference numerals in different figures denote the same elements, and descriptions and details of well-known features and techniques are omitted to avoid unnecessarily obscuring the invention. Furthermore, the terms front, back, upper, lower, first, second, and the like in the description and in the claims, if any, are used for descriptive purposes. However, it is understood that the embodiments of the invention described herein are capable of operation in other orientations than described or illustrated herein. It is further understood that the terms so used are for the purposes of describing relative positions and are interchangeable under appropriate circumstances.

DETAILED DESCRIPTION OF THE DRAWINGS

Figure 1:
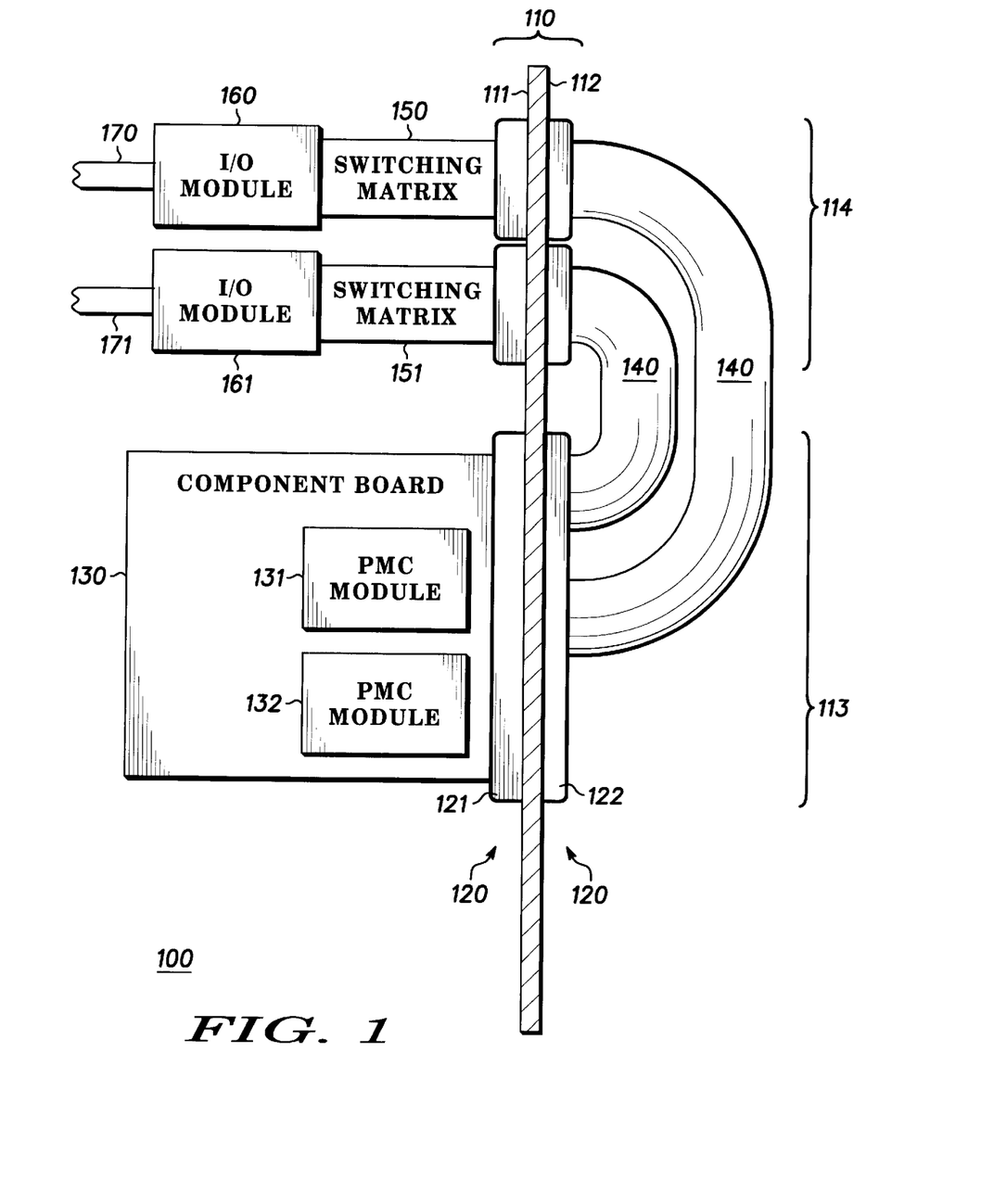
FIG. 1 illustrates a partial side view of a PCI computer system in accordance with an embodiment of the invention.

FIG. 1 illustrates a partial side view of a peripheral component interface (PCI) computer system 100. As used herein, the term "PCI" includes computer standards such as, for example, the PCI standard as well as the Compact™ standard. System 100 includes, among other features, a PCI backplane 110, a PCI bus 120, PCI component boards 130, a PCI controller board (not shown in FIG. 1), a PCI transition module 140, PCI switching matrices 150 and 151, and input/output (I/O) modules 160 and 161.

PCI backplane 110 has a first or front side 111 and a second or back side 112. Each of sides 111 and 112 have a first or lower portion 113 and a second or upper portion 114. PCI bus 120 is located at portion 113 of sides 111 and 112 of backplane 110. Bus 120 includes a plurality of board interface portions 121 at portion 113 of side 111 of backplane 110, and bus 120 also includes a plurality of transition module interface portions 122 at portion 113 of side 112 of backplane 110. FIG. 1 illustrates one each of portions 121 and 122, but at least two other ones of each of portions 121 and 122 are located behind the illustrated ones of portions 121 and 122 and are not visible in the side view of FIG. 1. As an example, interface portions 121 and 122 can have a conventional size of 6 units (6U), and the interface slots in portion 114 of backplane 110 can be a conventional size of 3 units (3U). Board interface portions 121 are each comprised of J1, J2, J3, J4, and J5 connectors, as known in the art.

PCI component boards 130 are located at portion 113 of side 111 in backplane 110. Each of boards 130 are inserted into different ones of board interface portions 121 to be located adjacent to and coupled to bus 120. FIG. 1 illustrates one of boards 130, but at least one other one of boards 130 are located behind the illustrated one of boards 130 and are not visible in the side view of FIG. 1. As an example, boards 130 can include PCI mezzanine card (PMC) modules 131 and 132. Boards 130 are described in more detail in FIG. 3.

The PCI controller board (not shown in FIG. 1) is also located at portion 113 of side 111 of backplane 110. The PCI controller board is inserted into a separate one of board interface portions 121 to be located adjacent to and coupled to bus 120. The PCI controller board is located behind the illustrated one of boards 130 and is not visible in the side view of FIG. 1. The PCI controller board is described in more detail in FIG. 3.

PCI transition module 140 is located adjacent to and coupled to PCI bus 120 at portion 113 of side 112 of backplane 110, and transition module 140 is also located adjacent to portion 114 of side 112 of backplane 110. Transition module 140 is inserted into interface portion 122 of bus 120 to couple portion 113 of backplane 110 to portion 114 of backplane 110. As an example, transition module 140 can be comprised of wires coupling the J3, J4, and/or J5 connectors of bus 120 to switching matrices 150 and 151. In FIG. 1, transition module 140 is only coupled to the J3 and J5 connectors of bus 120.

PCI switching matrices 150 and 151 are located adjacent to and coupled to portion 114 of side 111 of backplane 110. Switching matrices 150 and 151 are each coupled to all of component boards 130 and the controller board via portion 114 of backplane 110, transition module 140, and portion 113 of backplane 110. In the preferred embodiment, switching matrices 150 and 151 are identical to each other. Switching matrices 150 and 151 are described in more detail in FIG. 4.

I/O modules 160 and 161 are located at portion 114 of side 111 of backplane 110. 110 modules 160 and 161 are located adjacent to and are also coupled to switching matrices 150 and 151, respectively. I/O modules 160 and 161 are each coupled to all of component boards 130 and the controller board via switching matrices 150 or 151, portion 114 of backplane 110, transition module 140, and portion 113 of backplane 110.

I/O modules 160 and 161 permit component boards 130 to communicate with other boards, devices, or systems outside of system 100. In the embodiment illustrated in FIG. 1, I/O module 160 is coupled to the J5 connectors of board interface portions 121 in PCI bus 120, and I/O module 161 is coupled to the J3 connectors of board interface portions 121 in PCI bus 120. Accordingly, in the preferred embodiment, I/O modules 160: and 161 are different types of I/O modules. Preferably, a plurality of I/O modules can be coupled to each of switching matrices 150 and 151.

As an example, I/O modules 160 and 161 can have a flexible number of interfaces such as Ethernet ports, asynchronous transfer mode (ATM) ports, E1 ports, T1 ports, J1 ports, serial ports, parallel ports, or small computer system interface (SCSI) ports. E1 ports are serial network interfaces or serial links that are time-divided into 32 time slots. The overall ink has a throughput of approximately 2.048 Megabits per second (Mbps), and each of the 32 time slots has a throughput of approximate 16 kilobits per second (kbps). E1 ports are used hroughout the world. T1 ports are similar to E1 ports, except that T1 ports only have 24 time slots and are mainly used in the United States. J1 ports are primarily used in Japan.

Preferably, all of the signals in system 100 are digital until the signals reach I/O modules 160 and 161, which convert the signals, when necessary, to analog or other formats. Accordingly, I/O modules 160 and 161 contain circuitry needed for impedance matching, lightening suppression, and other non-digital I/O circuitry.

Wires 170 and 171 are coupled to I/O modules 160 and 161, respectively. Wires 170 and 171 carry data from I/O modules 160 and 161, respectively, to other component boards, devices, or systems outside of system 100. Wires 170 and 171 also carry data from other component boards, devices, or systems into system 100 via I/O modules 160 and 161.

Figure 2:
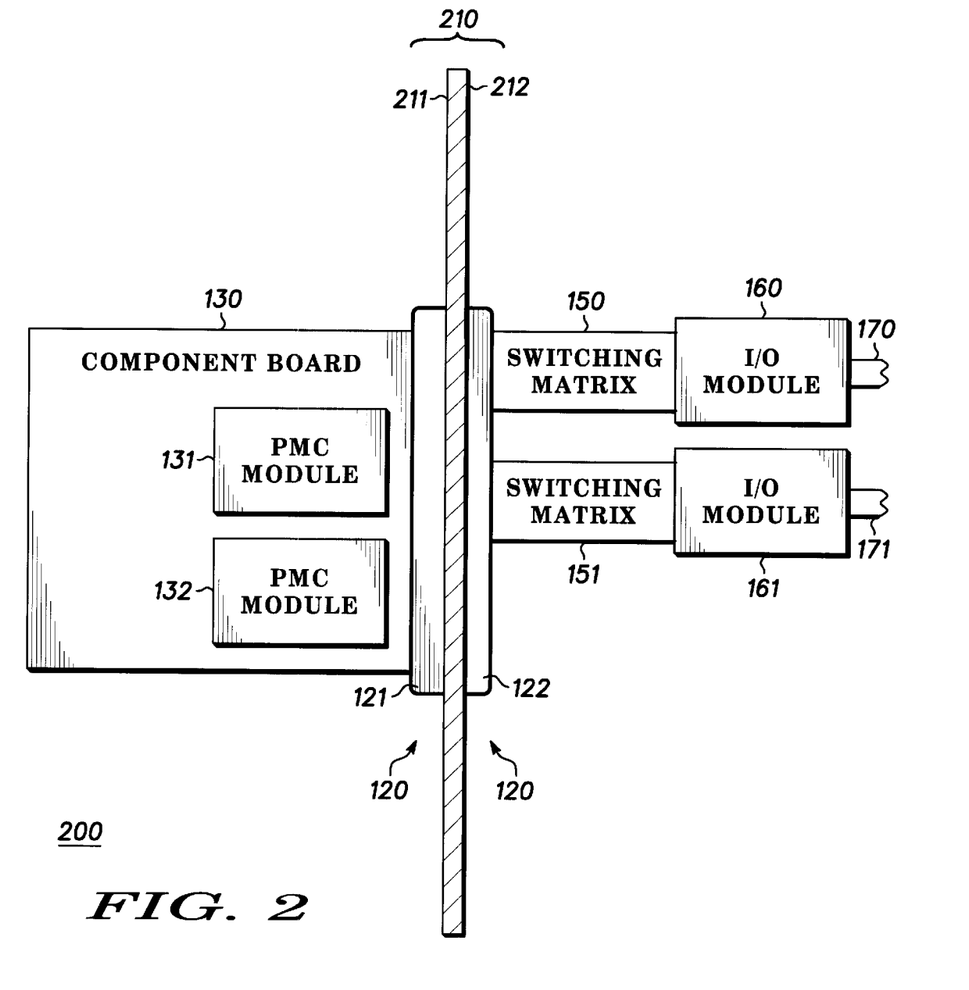
FIG. 2 illustrates a partial side view of a different PCI computer system in accordance with an embodiment of the invention.

FIG. 2 illustrates a partial side view of a PCI computer system 200, which is a different embodiment of a PCI computer system than system 100 in FIG. 1. System 200 in FIG. 2 is similar to system 100 in FIG. 1, except that system 200 does not include a transition module such as transition module 140 in system 100 of FIG. 1 and except that the backplane of system 200 does not include a second backplane portion such as portion 114 in backplane 110 in system 100 of FIG. 1. System 200 in FIG. 2 includes a backplane 210 with a first or front side 211 and a second or back side 212. PCI bus 120 of system 200 is located at sides 211 and 212 of backplane 210. Component boards 130 of system 200 are located at side 211 of backplane 210, and switching matrices 150 and 151, I/O modules 160 and 161, and wires 170 and 171 of system 200 are located at side 212 of backplane 210.

Figure 3:
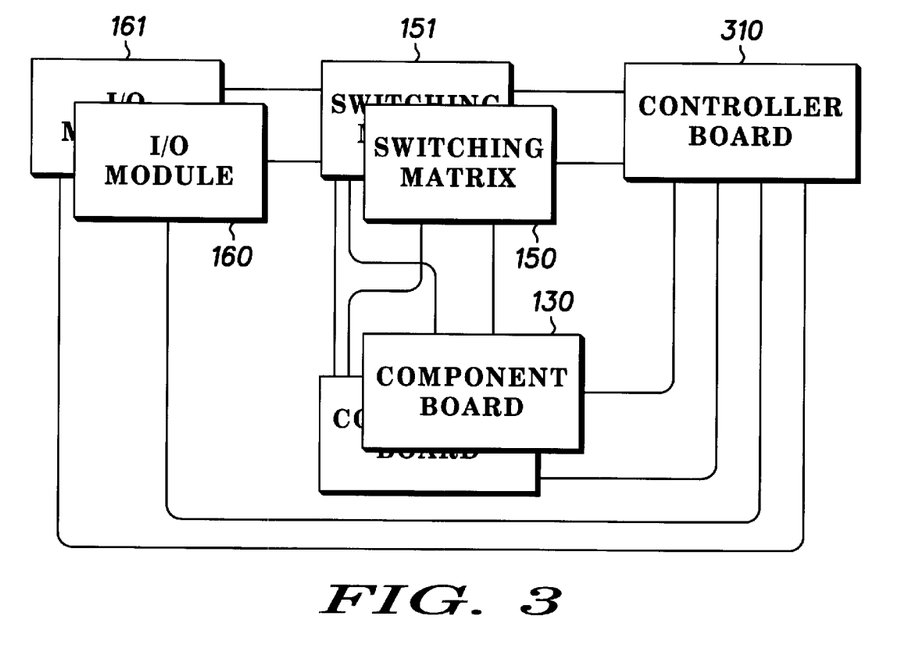
FIG. 3 illustrates a block diagram of a portion of the PCI computer system of FIGS. 1 and 2 in accordance with an embodiment of the invention.

FIG. 3 illustrates a block diagram of a portion of PCI computer systems 100 and 200 in FIGS. 1 and 2, respectively. FIG. 3 illustrates the electrical interconnection of component boards 130, switching matrices 150 and 151, I/O modules 160 and 161, and a controller board 310. Each of component boards 130 is coupled to each of switching matrices 150 and 151, and each of component boards 130 is also coupled to controller board 310. I/O modules 160 and 161 are coupled to switching matrices 150 and 151, respectively, and each of I/O modules 160 and 161 are coupled to controller board 310. Furthermore, each of switching matrices 150 and 151 is coupled to controller board 310.

Each part of systems 100 (FIG. 1) and 200 (FIG. 2) that is illustrated in FIG. 3 includes software. The software on controller board 310 permits board 310 to query the I/O modules and the component boards of systems 100 and 200 to determine if an old I/O module or component board has been removed from systems 100 and 200 and/or if a new I/O module or component board has been installed into system 100. As an example, controller board 310 can query the I/O modules and the component boards at system initialization and can also periodically query the I/O modules and the component boards once every minute during system operation to be compatible with the hot-swapping standard.

In a first embodiment of systems 100 and 200, configuration or driver software on component boards 130 comprises the pin-out configuration of the respective one of boards 130 to enable boards 130 to communicate their respective pin-out information to controller board 310. Similarly, configuration or driver software in I/O modules 160 and 161 comprises the pin-in configuration of the respective one of modules 160 and 161 to enable modules 160 and 161 to communicate their respective pin-in information to controller board 310. Configuration or driver software on controller board 310 enables controller board 310 to configure switching matrices 150 and 151 to make the pin-out configurations of each of component boards 130 compatible with the pin-in configurations of each of I/O modules 160 and 161 and vice versa.

In a second embodiment of systems 100 and 200, the software on component boards 130 comprises board identification information, and the software in I/O modules 160 and 161 comprises I/O module identification information. In this second embodiment, the software on controller board 310 comprises software for component boards 130 and also for I/O modules 160 and 161. The software on controller board 310 comprises the pin-out configuration of component boards 130 and the pin-in configuration for I/O modules 160 and 161. The software on controller board 310 can also include software for other types of component boards and other types of I/O modules that are not currently used in systems 100 or 200, but that may be used in systems 100 or 200 in the future. The PCI controller board uses the software to configure switching matrices 150 and 151 to make the pin-out configurations of each of component boards 130 compatible with the pin-in configurations of each of I/O modules 160 and 161 and vice versa.

The following example generally describes how an E1 interface is connected and configured in system 100 for a telecommunications application where a telecommunications time division multiplexing (TDM) bus is on backplane 110 (FIG. 1) across J4. Accordingly, in this example, only J3 and J5 are coupled to transition module 140 (FIG. 1). For purposes of this example, the E1 interface is located within I/O module 161. A new component board containing a PMC module is inserted into system 100, and the hot-swap software on controller board 310 detects the new component board. Then, controller board 310 communicates with the new component board and I/O module 161. Controller board 310 subsequently configures switching matrix 151 to accommodate the E1 line in I/O module 161 to the pins on backplane 110 and the new component board. The impedance matching circuitry and the protection circuitry for the E1 interface are located in I/O module 161. The use of switching matrix 151 permits I/O module 151 having the E1 interface to be used with any component board regardless of the pin-out of the PMC module to backplane 110.

Figure 4:
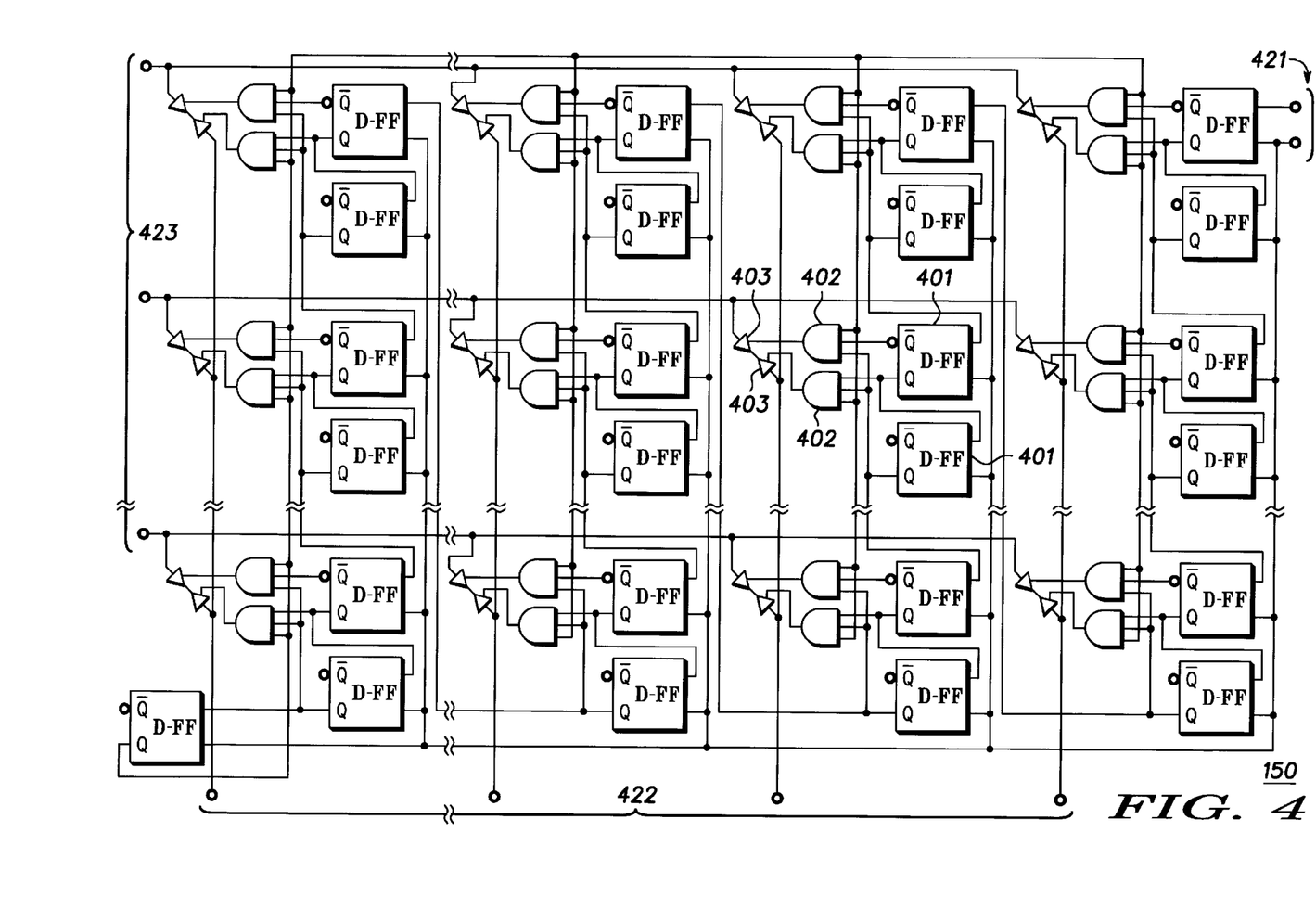
FIG. 4 illustrates a schematic diagram of a switching matrix in the PCI computer system of FIGS. 1 and 2 in accordance with an embodiment of the invention.

FIG. 4 illustrates a schematic diagram of switching matrix 150 in PCI computer systems 100 and 200 of FIGS. 1 and 2, respectively. In the preferred embodiment, switching matrix 150 is comprised of a field programmable gate array (FPGA) device. Switching matrix 151 (FIGS. 1 and 2) can be identical to switching matrix 150 and can be comprised of a separate FPGA device.

The FPGA device of switching matrix 150 includes a set of signal lines 421 coupled to controller board 310 (FIG. 3) for dynamically programming the FPGA device. The FPGA device also includes a set of data lines 422 coupled to component boards 130 (FIG. 3) for receiving data from or transmitting data to boards 130. The FPGA device further includes a set of data lines 423 coupled to I/O module 160 (FIG. 3) for relaying the data received from component boards 130 to I/O module 160 or for relaying the data received from I/O module 160 to component boards 130. Preferably, a clock line runs through the FPGA device for each of the I/O modules in the computer system. As an example, the FPGA device can include repeated pairs of D-Q flip flops 401, AND gates 402, and diodes 403 for each data line. These pairs are arranged into a square array to form a bi-directional switching matrix or cross-connect between the component boards and the I/O modules.

With minimal modifications, the functionality and modularity of switching matrices 150 and 151 are compatible with the I/O standards of PMC modules recommended by the Compact PCI (TM) standards committees: (1) mapping a single PMC I/O to J2 when using 3U boards and a 32-bit PCI bus, (2) mapping dual PMC I/O to J3 and J4 when the telecommunications bus is not being used, (3) mapping single PMC I/O to J5 when the telecommunications bus is being used, and (4) mapping dual PMC I/O to J5 when the telecommunications bus is being used. When dual PMC I/O is mapped to J3 and J4, the maximum dimension of the FPGA device is preferably 145 inputs and 145 outputs. When other configurations of PMC I/O are used, component boards 130 (FIG. 3) communicate with controller board 310 (FIG. 3) to determine which ones of data lines 422 and 423 are to be used. The remaining ones of data lines 422 and 423 are held in an open collector state and are not used.

Figure 5:
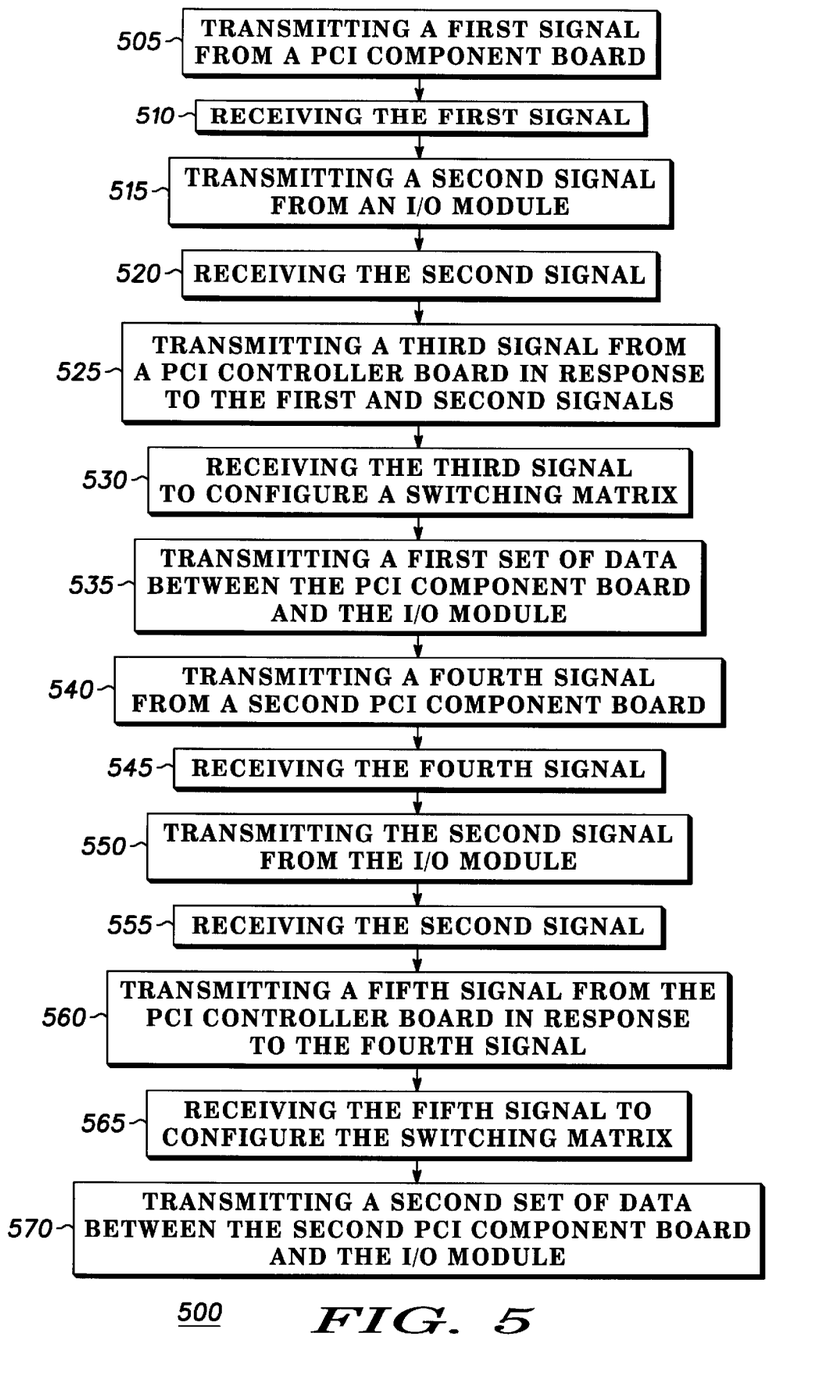
FIG. 5 illustrates a flow chart for a method of operating the PCI computer system of FIGS. 1 and 2 in accordance with an embodiment of the invention.

FIG. 5 illustrates a flow chart for a method 500 of operating PCI computer systems 100 and 200 in FIGS. 1 and 2, respectively. In a step 505 of method 500 in FIG. 5, a first one of component boards 130 (FIG. 3) transmits a first signal. In a first embodiment of method 500, the first component board transmits its pin-out configuration to controller board 310 (FIG. 3) during step 505. In a second embodiment of method 500, the first component board transmits its board identification information to controller board 310 during step 505. In a step 510 of FIG. 5, controller board 310 (FIG. 3) receives the first signal transmitted by the first component board in step 505.

Next, in a step 515 of FIG. 5, I/O module 160 (FIG. 3) transmits a second signal. In the first embodiment of method 500, I/O module 160 transmits its pin-in configuration to controller board 310 (FIG. 3) during step 515. In the second embodiment of method 500, I/O module 160 transmits its module identification information to controller board 310 during step 515. In a step 520 of FIG. 5, controller board 310 (FIG. 3) receives the second signal transmitted by I/O module 160 (FIG. 3) in step 515.

Then, in a step 525 of FIG. 5, controller board 310 (FIG. 3) transmits a third signal in response to the first and second signals. This third signal is used to dynamically configure or program switching matrix 150 (FIG. 3) to permit the first component board to transfer a first set of data to I/O module 160 (FIG. 3) or to permit I/O module 160 to transfer data to the first component board. In the first embodiment of method 500, controller board 310 uses the pinout and pin-in configurations of the first and second signals, respectively, to determine the third signal. In the second embodiment of method 500, controller board 310 searches for a pin-out configuration of the first component board in response to or based on the board identification information from the first signal before transmitting the third signal, and controller board 310 also searches for a pin-in configuration of I/O module 160 in response to or based on the module identification information from the second signal before transmitting the third signal. Controller board 310 then uses the pin-out and pin-in configuration to determine the third signal. In a step 530 of FIG. 5, switching matrix 150 (FIG. 3) receives the third signal, which configures or programs switching matrix 150.

Subsequently, in a step 535 of FIG. 5, a first set of data is transmitted between the first component board and I/O module 160 (FIG. 3) after controller board 310 (FIG. 3) transmits the third signal. In the preferred embodiment, the first component board transmits the data through switching matrix 150 (FIG. 3) to I/O module 160 (FIG. 3), and/or I/O module 160 transmits the data through switching matrix 150 to the first component board.

In a step 540 of FIG. 5, a second one of component boards 130 transmits a fourth signal. In the first embodiment of method 500, the second component board transmits its pin-out configuration to controller board 310 (FIG. 3) during step 540. In the second embodiment of method 500, the second component board transmits its board identification information to controller board 310 during step 540. In a step 545 of FIG. 5, controller board 310 (FIG. 3) receives the fourth signal transmitted by the second component board in step 540.

Next, in an optional step 550 of FIG. 5, I/O module 160 (FIG. 3) transmits the second signal previously transmitted during step 515. If step 550 is used in the first embodiment of method 500, I/O module 160 transmits its pin-in configuration to controller board 310 (FIG. 3) during step 550. If step 550 is used in the second embodiment of method 500, I/O module 160 transmits its module identification information to controller board 310 during step 550. In an optional step 555 of FIG. 5, controller board 310 (FIG. 3) receives the second signal transmitted by I/O module 160 (FIG. 3) in step 550. If optional steps 550 and 555 are not performed during method 500, then controller board 310 preferably remembers the second signal previously received during step 520.

Then, in a step 560 of FIG. 5, controller board 310 (FIG. 3) transmits a fifth signal in response to the fourth and second signals. This fifth signal is used to dynamically configure or program switching matrix 150 (FIG. 3) to permit the second component board to transfer a second set of data to I/O module 160 (FIG. 3) or to permit I/O module 160 to transfer data to the second component board. In the first embodiment of method 500, controller board 310 uses the pin-out and pin-in configurations of the fourth and second signals, respectively, to determine the third signal. In the second embodiment of method 500, controller board 310 searches for a pin-out configuration of the second component board in response to or based on the board identification information from the fourth signal before transmitting the fifth signal, and controller board 310 also searches for a pin-in configuration of I/O module 160 in response to or based on the module identification information from the second signal before transmitting the fifth signal. Controller board 310 then uses the pin-out and pin-in configuration to determine the fifth signal. In a step 565 of FIG. 5, switching matrix 150 (FIG. 3) receives the fifth signal, which configures or programs switching matrix 150.

Subsequently, in a step 570 of FIG. 5, a second set of data is transmitted between the second component board and I/O module 160 (FIG. 3) after controller board 310 (FIG. 3) transmits the fifth signal. In the preferred embodiment, the second component board transmits the data through switching matrix 150 (FIG. 3) to I/O module 160 (FIG. 3), and/or I/O module 160 transmits the data through switching matrix 150 to the second component board.

Therefore, an improved PCI computer system and method of operation is provided to overcome the disadvantages of the prior art. The PCI computer system includes a dynamically programmable transition module for use with a plurality of different component boards and a plurality of different I/O modules made by different manufacturers. The computer system can switch any input to any output and is compatible with conventional hot-swapping standards. The computer system of FIG. 1 also minimizes the potential of a hardware failure occurring at the backside of the backplane to which access is generally blocked by a wall in the room containing the computer system.

Although the invention has been described with reference to specific embodiments, it will be understood by those skilled in the art that various changes may and modifications be made without departing from the spirit or scope of the invention. For instance, the numerous details set forth herein such as, for example, the size of the FPGA device in FIG. 4 is provided to facilitate the understanding of the invention and are not provided to limit the scope of the invention. Additionally, switching matrices 150 and 151 can each be comprised of a cross-bar switch, a programmable logic device (PLD), a generic array logic (GAL) device, a programmable array logic (PAL) device, or other similar signal switching device, instead of FPGA devices. As another example, switching matrices 150 and 151 can be different from each other. Furthermore, in method 500 of FIG. 5, steps 515 and 520 can be performed before steps 505 and 510, and steps 550 and 555 can be performed before steps 540 and 545. Moreover, step 515 can be performed by I/O module 161, instead of I/O module 160; step 530 can transmit the third signal to switching matrix 151, instead of switching matrix 150; and step 535 can involve switching matrix 151 and I/O module 161, instead of switching matrix 150 and I/O module 160, respectively. Similar modifications can be made to steps 550, 565, and 570. Alternatively, steps 515, 530, and 535 can remain the same while steps 550, 565, and 570 are modified, or vice versa. Furthermore, method 400 may also be modified to use the same component board throughout the method while the I/O module is changed between steps 515 and 535 and steps 550 and 570. In other alternative embodiments of method 500, the component boards can transmit their respective pin-out configurations while the I/O modules transmit their module identification information, or the component boards can transmit their board identification information while the I/O modules transmit their respective pin-in configurations. Still further, the concepts described herein can provide a universal transition module for other backplanes such as, for example, Versa Module Eurocard (VME). Accordingly, the disclosure of embodiments of the invention is intended to be illustrative of the scope of the invention and is not intended to be limiting. It is intended that the scope of the invention shall be limited only to the extent required by the appended claims.

What is claimed is:

1. A PCI computer system comprising:

a PCI bus;

component boards adjacent to and coupled to the PCI bus;

a controller board adjacent to and coupled to the PCI bus;

a transition module adjacent to and coupled to the PCI bus;

a switching matrix adjacent to and coupled to the transition module; and an I/O module adjacent to and coupled to the switching matrix and coupled to the component boards and the controller board via the switching matrix, the transition module, and the PCI bus.

2. The PCI computer system of claim 1 further comprising:

software on the controller board, wherein:
the software comprises a pin-in configuration for the I/O module.

3. The PCI computer system of claim 1 further comprising:

software on the controller board, wherein:
the software comprises pin-out configurations for the component boards.

4. The PCI computer system of claim 1 further comprising:

software on the controller board to configure the switching matrix to make a pin-out configuration of one of the PCI component boards compatible with a pin-in configuration of the I/O module.

5. The PCI computer system of claim 1 further comprising:

software on the component boards to communicate pin-out information of the respective component board to the controller board.

6. The PCI computer system of claim 1 further comprising:

software in the I/O module to communicate pin-in information of the I/O module to the controller board.

7. The PCI computer system of claim 1 wherein:

the transition module comprises wires coupling the PCI bus to the switching matrix.

8. The PCI computer system of claim 1 wherein:

the switching matrix is comprised of a field programmable gate array device.

9. A PCI computer system comprising:
a PCI backplane having a first side and a second side, each of the first and second sides having first and second portions;
a PCI bus at the first portion of the first and second sides of the PCI backplane;
PCI component boards adjacent to and coupled to the PCI bus at the first portion of the first side of the PCI backplane;
a PCI controller board adjacent to and coupled to the PCI bus at the first portion of the first side of the PCI backplane;
a PCI transition module adjacent to and coupled to the PCI bus at the first portion of the second side of the PCI backplane, adjacent to the second portion of the second side of the PCI backplane, and coupling the first portion of the PCI backplane to the second portion of the PCI backplane;
a first PCI switching matrix adjacent to and coupled to the second portion of the first side of the PCI backplane and coupled to each of the PCI component boards and the PCI controller board via the second portion of the PCI backplane, the PCI transition module, and the first portion of the PCI backplane;
a second PCI switching matrix adjacent to and coupled to the second portion of the first side of the PCI backplane and coupled to each of the PCI component boards and the PCI controller board via the second portion of the PCI backplane, the PCI transition module, and the first portion of the PCI backplane;
a first type of I/O module adjacent and coupled to the first PCI switching matrix, at the second portion of the first side of the PCI backplane, and coupled to each of the PCI component boards and the PCI controller board via the first PCI switching matrix, the second portion of the PCI backplane, the PCI transition module, and the first portion of the PCI backplane; and
a second type of I/O module different from the first type of I/O module, adjacent and coupled to the second PCI switching matrix, at the second portion of the first side of the PCI backplane, and coupled to each of the PCI component boards and the PCI controller board via the second PCI switching matrix, the second portion of the PCI backplane, the PCI transition module, and the first portion of the PCI backplane.

10. The PCI computer system of claim 9 further comprising:
configuration software on the PCI controller board, wherein:
the configuration software comprises configuration software for the first type of I/O module, the second type of I/O module, and the PCI component boards; and
the PCI controller board uses the configuration software to configure the first and second PCI switching matrices to make a pin-out configuration of each of the PCI component boards compatible with pin-in configurations of the first and second type of I/O modules.

11. The PCI computer system of claim 9 further comprising:
configuration software on the PCI component boards to communicate pin-out information of the respective PCI component board to the PCI controller board; and
additional configuration software on the first and second types of I/O modules to communicate pin-in information of the respective I/O module to the PCI controller board.

12. The PCI computer system of claim 9 wherein:
the transition module comprises wires at the second side of the PCI backplane and coupling the first portion of the PCI backplane to the second portion of the PCI backplane.

13. The PCI computer system of claim 9 wherein:
the first and second PCI switching matrices are each comprised of a field programmable gate array device.

14. A method of operating a PCI computer system comprising:
transmitting a first signal from a PCI component board via a transition module;
receiving the first signal;
transmitting a second signal from an I/O module via a transition module;
receiving the second signal;
transmitting a third signal from a PCI controller board in response to the first and second signals;
receiving the third signal to configure a switching matrix; and
transmitting a first set of data between the PCI component board and the I/O module.

15. The method of claim 14 wherein:
transmitting the first set of data comprises transmitting the first set of data from the PCI component board through the switching matrix to the I/O module.

16. The method of claim 14 wherein:
transmitting the first signal comprises transmitting a board identification from the PCI component board.

17. The method of claim 14 wherein:
transmitting the second signal comprises transmitting a module identification from the I/O module.

18. The method of claim 14 further comprising:
searching for a pin-out configuration of the PCI component board.

19. The method of claim 14 further comprising:
searching for a pin-in configuration of the I/O module.

20. The method of claim 14 further comprising:
searching for a pin-out configuration of the PCI component board;
searching for a pin-in configuration of the I/O module; and
using the pin-in and pin-out configurations to determine the third signal.

21. The method of claim 14 wherein:
transmitting the first signal comprises transmitting a pin-out configuration.

22. The method of claim 14 wherein:
transmitting the second signal comprises transmitting a pin-in configuration.

23. The method of claim 14 further comprising:
using pin-in and pin-out configurations to determine the third signal, wherein:
transmitting the first signal comprises transmitting the pin-out configuration; and
transmitting the second signal comprises transmitting the pin-in configuration.

24. The method of claim 14 further comprising:
transmitting a fourth signal from a second PCI component board;
receiving the fourth signal;
transmitting a fifth signal from the PCI controller board in response to the fourth signal;

receiving the fifth signal to configure the switching matrix; and transmitting a second set of data between the second PCI component board and the I/O module.

25. The method of claim 24 further comprising:

transmitting the second signal from the I/O module; and receiving the second signal, wherein:
   transmitting the fifth signal comprises transmitting the fifth signal from the PCI controller board in response to the second and fourth signals.

26. The method of claim 24 wherein:

transmitting the first signal comprises transmitting a pin-out configuration;

transmitting the second signal comprises transmitting a pin-in configuration; and transmitting the fourth signal comprises transmitting a pin-out configuration.

27. The method of claim 24 further comprising:

searching for a pin-out configuration of the PCI component board before transmitting the third signal;

searching for a pin-in configuration of the I/O module before transmitting the third signal; and searching for a pin-out configuration of the second PCI component board before transmitting the fifth signal; wherein:
   transmitting the first signal comprises transmitting a board identification from the PCI component board;
   transmitting the second signal comprises transmitting a module identification from the I/O module; and
   transmitting the fourth signal comprises transmitting a board identification from the second PCI component board.

28. A method of operating a PCI computer system comprising:

transmitting a first signal from a PCI component board to a PCI controller board via a transition module;

transmitting a second signal from an I/O module to the PCI controller board via a transition module;

transmitting a third signal from the PCI controller board to a switching matrix in response to the first and second signals to dynamically configure the switching matrix to permit the PCI component board to transfer a first set of data to the I/O module; and transmitting the first set of data between the PCI component board and the I/O module through the switching matrix after transmitting the third signal.

29. The method of claim 28 wherein:

transmitting the first signal comprises transmitting a board identification for the PCI component board from the PCI component board to the PCI controller board; and transmitting the second signal comprises transmitting a module identification for the I/O module from the I/O module from the I/O module to the PCI controller board.

30. The method of claim 29 further comprising:

searching for a pin-out configuration of the PCI component board in response to the first signal;

searching for a pin-in configuration of the I/O module in response to the second signal; and using the pin-out and pin-in configurations to determine the third signal.

31. The method of claim 28 wherein:

transmitting the first signal comprises transmitting a pin-out configuration for the PCI component board from the PCI component board to the PCI controller board;

transmitting the second signal comprises transmitting a pin-in configuration for the I/O module from the I/O module from the I/O module to the PCI controller board.

32. The method of claim 28 further comprising:

transmitting a fourth signal from a second PCI component board to the PCI controller board after transmitting the first set of data from the PCI component board;

transmitting a fifth signal from the PCI controller board to the switching matrix in response to the fourth signal to dynamically configure the switching matrix to permit the second PCI component board to transfer a second set of data to the I/O module; and transmitting the second set of data between the second PCI component board and the I/O module through the switching matrix after transmitting the fifth signal.

33. The method of claim 32 further comprising:

transmitting the second signal from the I/O module to the PCI controller board after transmitting the first set of data from the PCI component board and before transmitting the fifth signal, wherein:
   transmitting the fifth signal further comprises transmitting the fifth signal from the PCI controller board to the switching matrix in response to the fourth and second signals to dynamically configure the switching matrix to permit the second PCI component board to transfer the second set of data to the I/O module.

* * * * *